(12) United States Patent
Briand

(10) Patent No.: US 10,889,382 B2
(45) Date of Patent: Jan. 12, 2021

(54) PNEUMATIC DEICING DEVICE FOR BREAKING AND REMOVING AN ICE DEPOSIT ACCUMULATED ON THE OUTER SURFACE OF AN AIRCRAFT

(71) Applicant: ZODIAC AEROSAFETY SYSTEMS, Plaisir (FR)

(72) Inventor: Valerie Briand, Saint-Ouen-Du-Tilleul (FR)

(73) Assignee: Safran Aerosystems

(*) Notice: Subject to any disclaimer, the term of this patent is extended or adjusted under 35 U.S.C. 154(b) by 123 days.

(21) Appl. No.: 15/842,023

(22) Filed: Dec. 14, 2017

(65) Prior Publication Data
US 2018/0178919 A1 Jun. 28, 2018

(30) Foreign Application Priority Data
Dec. 27, 2016 (FR) ...................................... 1663421

(51) Int. Cl.
*B64D 15/16* (2006.01)
*B29C 65/00* (2006.01)

(52) U.S. Cl.
CPC .......... *B64D 15/166* (2013.01); *B29C 66/433* (2013.01); *B29C 66/729* (2013.01)

(58) Field of Classification Search
CPC .................................................. B64D 15/166
See application file for complete search history.

(56) References Cited

U.S. PATENT DOCUMENTS

| | | | |
|---|---|---|---|
| 3,288,983 A * | 11/1966 | Lear, Sr. | ............... B64C 1/1476 219/522 |
| 4,101,497 A | 7/1978 | Charves et al. | |
| 4,336,291 A * | 6/1982 | Broadhurst | ...... B60K 15/03177 428/101 |
| 4,463,919 A | 8/1984 | Bac | |
| 4,590,122 A * | 5/1986 | Levin | ........................ B04C 1/00 428/367 |
| 5,164,242 A | 11/1992 | Webster et al. | |

(Continued)

FOREIGN PATENT DOCUMENTS

FR 2749562 12/1997

OTHER PUBLICATIONS

French Search Report dated Jul. 3, 2017.

*Primary Examiner* — Brian M O'Hara
*Assistant Examiner* — Michael B. Kreiner
(74) *Attorney, Agent, or Firm* — Gerald E. Hespos; Michael J. Porco; Matthew T. Hespos

(57) ABSTRACT

A pneumatic deicing device (1) is provided for breaking and removing an ice deposit accumulated on the outer surface (2) of an aircraft, in particular on an airplane wing. The device (1) includes an outer layer (15) intended to withstand the outside environment, an inner interface layer (50) intended to be connected to the outer surface (2) of the aircraft, and at least two outer (30) and inner (40) intermediate layers connected to one another by an array of stitches (36) so as to define deicing chambers (35) that can be inflated quickly to cause a mechanical action to break the ice. The outer intermediate layer (30) includes a knit textile layer (34). At least one interlayer (20; 32) made from polar elastomer material is arranged above the knit textile layer (34) and immediately in contact with the outer layer (15) and the knit textile layer (34).

8 Claims, 2 Drawing Sheets

(56) References Cited

U.S. PATENT DOCUMENTS

| | | | |
|---|---|---|---|
| 5,370,921 A * | 12/1994 | Cedarleaf | B32B 15/14 428/138 |
| 5,558,304 A | 9/1996 | Adams | |
| 6,247,669 B1 * | 6/2001 | Rauckhorst, III | B64D 15/166 244/134 A |
| 2002/0084382 A1 | 7/2002 | Crist | |
| 2011/0024409 A1 * | 2/2011 | Shah | B64D 15/12 219/482 |
| 2012/0034833 A1 * | 2/2012 | Schaube | A63C 11/227 442/172 |
| 2013/0196136 A1 * | 8/2013 | Contzen | B32B 27/28 428/221 |
| 2018/0346146 A1 * | 12/2018 | Sang | B64C 1/12 |
| 2019/0027913 A1 * | 1/2019 | Sang | B32B 15/14 |

* cited by examiner

PNEUMATIC DEICING DEVICE FOR BREAKING AND REMOVING AN ICE DEPOSIT ACCUMULATED ON THE OUTER SURFACE OF AN AIRCRAFT

BACKGROUND

Field of the Invention

The present invention relates to a deicing device of the pneumatic type for breaking and removing an ice deposit accumulated on the outer surface of an aircraft.

Description of the Related Art

In particular, although not exclusively, the deicing device is intended to equip the wings, empennages, engine air intakes or other similar aircraft parts, for example for airplanes or helicopters.

It is known, when these aircraft traverse areas where the weather conditions are harsh and unfavorable, that ice may in particular form over the longer or shorter term on these aerodynamic surfaces. This ice deposit may subsequently cause increased weight and a change in the aerodynamic profile of the wing that may modify the lift and drag of the aircraft, and therefore the in-flight behavior of the aircraft. Thus, the surfaces can be equipped with deicing devices of the electric resistance or inflatable envelope type.

In the latter case, to which the invention relates, the known deicing devices generally include a flexible envelope that at least partially covers said surface and can inflate quickly. Thus, when ice forms on the aerodynamic surface, pressurized gas is sent into the envelope. The envelope then undergoes an abrupt expansion that causes the layer of ice to break into a plurality of pieces, then the ejection thereof on said surface. Such devices are in particular described in patent FR2749562A1 or patent US2002084382.

Yet these devices have a major drawback, since the flexible envelope, which is generally of the type with multiple layers, is heavy, in particular due to the use of an intermediate layer that is very thick, and requires the application of a layer of glue that creates labor time.

Yet efforts to reduce mass are a recurring theme in aeronautics, since reducing weight makes it possible to achieve substantial fuel savings, which is a plus with respect to the environment and operating costs.

One aim of the present invention is therefore to resolve the aforementioned problems and to propose a solution that is quick and easy to implement, light and reliable, by eliminating the intermediate connecting layers and using a material compatible with the outer layer and having remarkable cold resistance properties.

SUMMARY

Thus, the present invention relates to a deicing device of the pneumatic type for breaking and removing an ice deposit accumulated on the outer surface of an aircraft, in particular on an airplane wing, comprising at least:
  an outer layer intended to withstand the outside environment, preferably made from polyurethane,
  an inner interface layer intended to be connected to the outer surface of the aircraft, preferably by gluing, and
  at least two outer and inner intermediate layers connected to one another by an array of stitches spaced apart so as to define deicing chambers that can be inflated quickly using injected pressurized air so as to create an expansion of the device causing a mechanical action to break the ice, the outer intermediate layer being made up of a deformable knit textile layer that is elastically deformable under the effect of the inflation, characterized in that at least one interlayer made from polar elastomer material is arranged above the knit textile layer of the upper intermediate layer and immediately in contact with the outer layer and the knit textile layer.

According to preferred embodiments, the device according to the present invention comprises at least one of the following features:
  the interlayer made from polar elastomer material is calendared with the outer layer or with the knit textile layer;
  the interlayer made from polar elastomer material is connected to the knit textile layer by adhering the latter;
  two superimposed interlayers of polar elastomer material are arranged between the knit textile layer and the outer layer;
  the polar elastomer material is epichlorohydrin;
  the grade of epichlorohydrin used has a glass transition temperature below about −50° C. and preferably below about −60° C.;
  the epichlorohydrin used is a ter-polymer, for example in which a polypropylene oxide is introduced in place of the ethylene oxide;
  the outer layer is made from vulcanizable elastomer polyurethane, for example of the polyether type, and said outer layer and the polar elastomer interlayer are connected to one another by chemical co-vulcanization bonds, for example of the cross-linking type with sulfur or peroxide;
  the thickness of the assembly formed by the outer layer and all of the polar elastomer interlayer is comprised between about 0.6 mm and 1 mm, and preferably less than about 0.8 mm; and
  the outer layer contains carbon fillers.

The present invention will now be described in more detail in reference to specific embodiments provided as an illustration only and shown in the appended figures.

DETAILED DESCRIPTION

Figure 1:
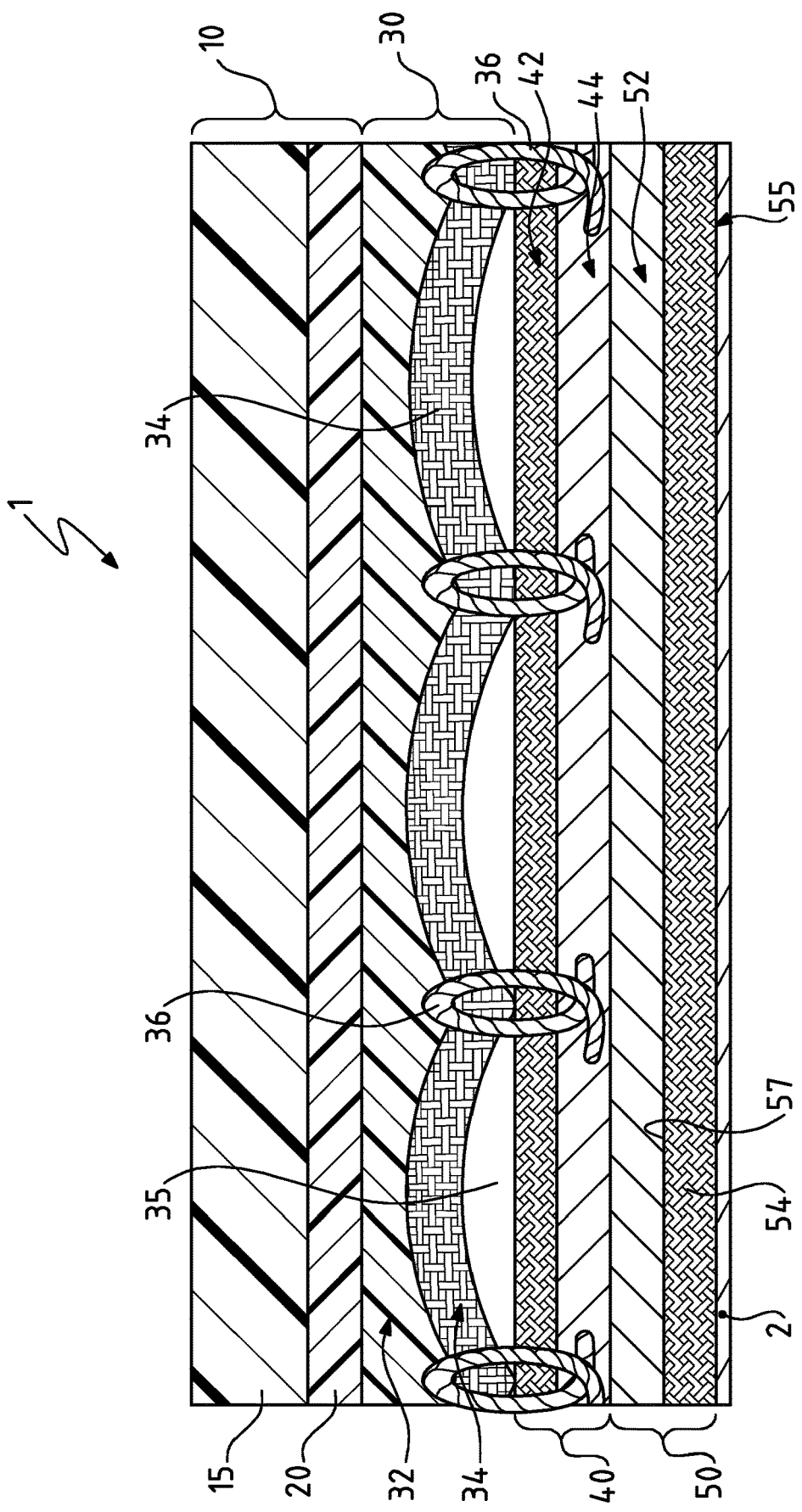
FIG. 1 is a schematic sectional view of a first embodiment of a deicing device for an aircraft according to the present invention.

FIG. 1 shows a deicing device 1 of the pneumatic type for breaking and removing an ice deposit accumulated on the outer surface of an aircraft, for example an airplane wing in the case at hand.

The device 1 includes, from the outside toward the surface 2 of the aircraft:
  an outer layer 15 intended to withstand the outside environment (fluids, abrasion, projected stones) and on which ice may become deposited. This outer layer 15 is typically made from vulcanizable elastomer polyurethane (PU) of the polyether polyurethane type, a polar elastomer making it possible to withstand fluids. A layer 20 made from polar elastomer materials such as epichlorohydrin is calendared with the layer 15 to form a sheet 10. Advantageously, the polyurethane layer 15 will be black and the epichlorohydrin layer 28 will be made in a different color, preferably lighter to ensure visual mistake-proofing during the placement of the sheet 10;

an outer intermediate layer 30 including a layer 32 made from polar elastomer material such as epichlorohydrin and a deformable textile net layer 34 that allows the inflation of inner chambers 35 connected to a pressurized air injection device (not shown). The layer of epichlorohydrin 32 is connected to the textile layer 34 for example by adhering the latter;

an inner intermediate layer 40, forming the inflatable chambers 35 with the textile net layer 34 of the outer intermediate layer 30. This inner intermediate layer 40 includes a textile layer 42, for example obtained by weaving, and a layer 44 preferably made up of elastomer, for example elastomer of the natural (NR), polyisoprene (IR), polybutylene (BR), chloroprene (CR), polyurethane (PU) or epichlorohydrin (ECO) type. The outer 30 and inner 40 intermediate layers are connected to one another using an array of stitches 36 spaced apart to form the inner chambers 35 between them;

an inner interface layer 50 intended to be connected to the outer surface 2 of the aircraft, preferably by gluing its surface. This inner interface layer 50 includes a layer of rubber 52 and a textile layer 54 whereof the inner surface 55 is glued to the outer surface 2 of the aircraft. To that end, the inner surface 55 may or may not be treated with an adhering solution.

The textile layer 54 is for example a knit textile layer, a woven textile layer, a nonwoven textile obtained mechanically, by gluing or welding, an inlaid web textile, a grid textile or a unidirectional (UD) fabric. However, a textile layer obtained by weaving identical to the textile layer 42 will preferably be chosen. A woven material will be easier to impregnate/seal with the glue compared to a knit; it will also be mechanically stronger (in particular in terms of tearing) than textile backings of the nonwoven or UD or inlaid web or grid type.

The textile layer 54 is made up of a material belonging to the list comprising polyamide, polyester, rayon, cotton, glass, polyethylene, polypropylene, aramid, para-aramid, polytetrafluoroethylene (PTFE), polyether ether ketone (PEEK), or carbon, or a combination of these materials. Preference will be given to polyamide generally having good adherence and a lower cost than aramids or carbon.

The outer surface 57 of the textile layer 54 is treated with a full bath adhering solution, for example of the RFL (Resorcinol, Formol, Latex) type, in a solution comprising isocyanates or reactive resins. This outer surface 57 may also have undergone electrostatic treatment, for example of the Corona type, by atmospheric plasma or by fibroline.

The textile layer 54 may be tinted; yarns dyed in the mass may also be used in its composition.

The layer of rubber 52 is in turn preferably made from elastomer, for example elastomer of the natural (NR), polyisoprene (IR), polybutylene (BR), chloroprene (CR), polyurethane (PU) or epichlorohydrin (ECO) type. This layer not being subject to the outside environment and not needing to have an excellent cold elasticity, unlike the layer 32 that must be able to inflate, many other elastomers may be suitable.

The layer of rubber 52 has a thickness of about 0.10 to 0.30 mm, and advantageously from 0.15 to 0.25 mm (0.20 mm±0.05 mm). The thickness of this layer is optimized to make it possible to seal the stitches 36 while using the minimum mass necessary to perform this function without reducing the holding reliability of the cycling of the deicer.

Typically, it will be possible to use a fabric with a maximum surface mass of 400 g/m$^2$ to produce the textile layer 54, knowing that beyond 300 g/m$^2$, the mass gain contributed is no longer truly significant for the application. In the proposed example, the textile layer 54 has a surface mass below 120 g/m$^2$. The elastomer layer 52 in turn has an optimized thickness, the total surface mass of the inner layer 50 is about 335 g/m$^2$, which represents a gain of 295 g/m$^2$ relative to the layer of the prior art, which has a surface mass of about 630 g/m$^2$.

The layer 40 is obtained by calendaring of the layer 44 on the adhered textile 42.

Thus, the layer 50 may be obtained by using the material of the layer 40 in the opposite direction (head to tail), the two layers of elastomer 44 and 52 being connected to one another, preferably by co-vulcanization. Thus, from an industrial perspective, the layers 40 and 50 can be made from the same material, which makes it possible to decrease the number of references.

Figure 2:
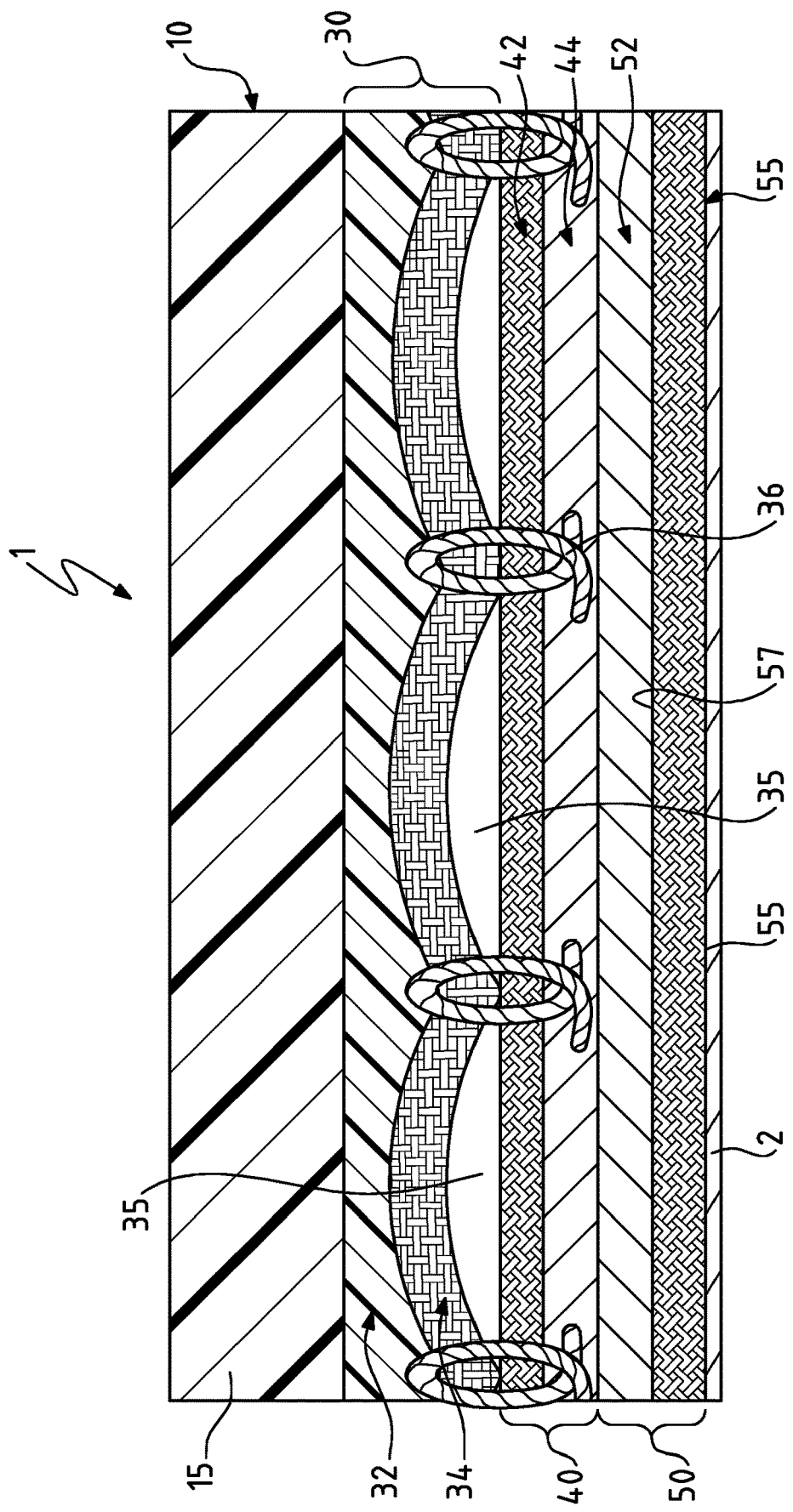
FIG. 2 is an alternative embodiment of FIG. 1.

According to one alternative embodiment shown in FIG. 2, the layer 20 does not exist (the sheet 10 is completely made up of the polyurethane layer 15) and only the layer 32 of epichlorohydrin is provided between the textile layer 34 and the outer layer 15.

Typically, the thickness of the assembly made up of the polyurethane layer 15 and the epichlorohydrin layer (layer 32 or layers 20 and 32) is comprised between about 0.6 mm and 1 mm, and preferably below about 0.8 mm. This is due to the fact that it is no longer necessary to provide a relatively thick (0.20 to 0.35 mm minimum in the prior art) intermediate connecting layer as well as the layer(s) of glue in the connection between the outer intermediate layer 30 and the outer layer 15.

Yet in the prior art, these glues use products in the solvent phase. These products are harmful for the environment and undesirable for operators due to the associated risks of toxicity. The solution thus presented makes it possible, in addition to the significant weight savings (from 10 to 15%), to simplify the industrial process by eliminating layers of glue and reducing the number of components. This simplification also allows improved reliability, better cycling strength.

In both embodiments, the type of epichlorohydrin to be used must be chosen wisely to preserve its cold flexibility, since the inflation of the chambers must be able to be done up to very low temperatures of about −45° C. Thus, the glass transition temperature of the selected grade of epichlorohydrin must be below −50° C., and preferably below about −60° C.

This type of grade may be found from among the epichlorohydrin rubbers of the ter-polymer type (GECO). An example grade that may be suitable is an epichlorohydrin of the GECO type in which a propylene oxide is introduced in place of the ethylene oxide (EO) typically used. This configuration allows it to achieve remarkable cold properties.

Unlike the materials typically used (natural rubber, for example), which are non-polar elastomers, epichlorohydrin is a polar elastomer that will allow a chemical bond to be formed directly with the polyurethane with no intermediate layer or glues. The advantage of this epichlorohydrin layer is that it allows a bond of the co-vulcanization type with the elastomer polyurethane making up the outer layer of the deicer.

The operation of the device 1 according to the present invention, when it is glued on the outer surface 2 of an aircraft, is as follows.

When ice is deposited in a sheet on the outer layer 10, a pressurized gas is injected into the inflatable chambers 35 so as to deform the textile layer 34 of the outer intermediate layer 30 very quickly under the effect of the injected gas. This abrupt mechanical action of the deicing device 1 breaks and expels said ice to the outside, such that the surface 2 of the aircraft is no longer subject to malfunctions. This inflation can be done repeatedly to optimize the breaking and expulsion of the ice. In general, there are two different cycles, a fast one and a slow one. Based on the deicing conditions (slow/low or fast/high accretion), either the slow mode or the fast mode will be chosen.

The solution thus described allows a non-negligible gain in weight owing to the use of a smaller number of layers and/or optimized management of their respective thicknesses and surface masses, while facilitating the production of the deicing device in the case where the layers 40 and 50 are identical and connected to one another head to tail.

It goes without saying that the detailed description of the object of the Invention, provided solely as an illustration, in no way constitutes a limitation, the technical equivalents also being comprised in the scope of the present invention.

Thus, the layers 44 and 52 can be made up of two layers.

What is claimed is:

1. A pneumatic deicing device for breaking and removing an ice deposit accumulated on the outer surface of an aircraft, comprising at least:
   an outer layer made from polyurethane intended to withstand an outside environment, preferably,
   an inner interface layer connected to the outer surface of the aircraft, and
   at least an outer intermediate layer and an inner intermediate layer connected to one another by an array of stitches spaced apart so as to define deicing chambers that can be inflated quickly using injected pressurized air so as to create an expansion of the device causing a mechanical action to break the ice, the outer intermediate layer being made of a deformable knit textile layer that is elastically deformable under the effect of the inflation,
   at least one interlayer made from polar elastomer material and arranged above the knit textile layer of the outer intermediate layer and immediately in contact with both the outer layer and the knit textile layer,
   wherein the polar elastomer material of the at least one interlayer is epichlorohydrin, and
   wherein the at least one interlayer is secured in contact with at least one of the outer layer and the knit textile layer of the outer intermediate layer without an intermediate layer or glue therebetween.

2. The device of claim 1, wherein the interlayer made from epichlorohydrin is calendared with the outer layer or with the knit textile layer.

3. The device of claim 1, wherein the interlayer made from epichlorohydrin is connected to the knit textile layer by a chemical bond.

4. The device of claim 1, wherein the epichlorohydrin interlayer includes two superimposed interlayers arranged between the knit textile layer and the outer layer.

5. The device of claim 4, wherein the outer layer is made from vulcanizable elastomer polyurethane, and the outer layer and the epichlorohydrin interlayer are connected to one another by chemical co-vulcanization bonds.

6. The device of claim 1, wherein the epichlorohydrin has a glass transition temperature below about −50° C.

7. The device of claim 6, wherein the epichlorohydrin is a ter-polymer.

8. The device of claim 1, wherein the thickness of the assembly formed by the outer layer and all of the epichlorohydrin interlayer or is between about 0.6 mm and 1 mm.

* * * * *